June 7, 1927.
W. HILDEBRAND
1,631,815
BRAKE ACCELERATOR FOR SINGLE CHAMBER COMPRESSED AIR BRAKES
Filed Dec. 30, 1926
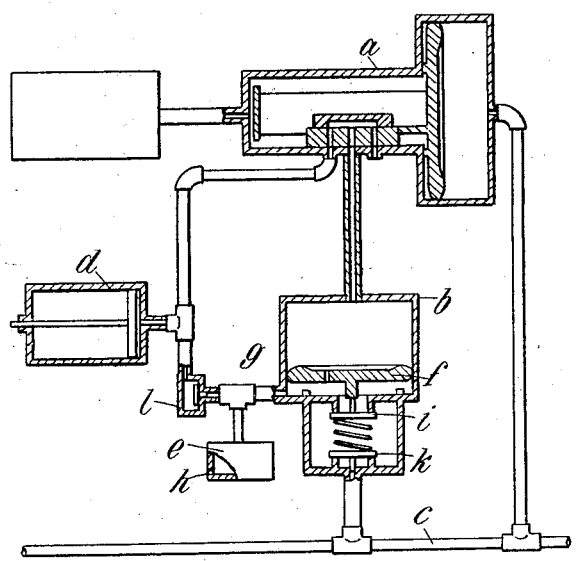
Inventor
Wilhelm Hildebrand
By Cushman, Bryant & Darby
Attys Patented June 7, 1927.

1,631,815

UNITED STATES PATENT OFFICE.

WILHELM HILDEBRAND, OF LICHTERFELDE, BERLIN, GERMANY.

BRAKE ACCELERATOR FOR SINGLE-CHAMBER COMPRESSED-AIR BRAKES.

Application filed December 30, 1926, Serial No. 158,056, and in Germany November 20, 1925.

This invention relates to brake accelerators for single chamber compressed air brakes, of the kind wherein the air from the train pipe is admitted to the brake cylinder for the purpose of increasing the braking pressure in case of emergency applications of the brakes. In such accelerators wherein the brake piston has to be moved in order to provide the space required for receiving the air from the train pipe, the spring controlled brake piston connected with the brake equipment naturally offers to such movement a not inconsiderable resistance, which tends to retard the rapidity of the reduction of pressure in the train pipe.

Another imperfection of such devices is that an emergency braking initiated after a service braking has already been effected is not transmitted throughout the train with the required speed, as the pressure already produced in the brake cylinder during the service braking prevents the passage of air from the train pipe into the brake cylinder at the beginning of the emergency braking.

According to this invention, these imperfections are eliminated by inserting a chamber of small capacity into the connection between the train pipe and the brake cylinder, which connection is controlled by the emergency brake device, the said chamber however being large enough to ensure a fall of pressure in the train pipe which guarantees a quick transmission of the emergency braking throughout the whole train at the initiation of the emergency braking, even before the brake piston has provided sufficient space for the admission of a given volume of train pipe air. In order to ensure the required fall of pressure in the train pipe even in the case of an emergency braking following a preceding service braking, according to the invention, the above mentioned chamber is placed in communication with the atmosphere not only when the brakes are released, but also when the control valve is in the service braking position by means of a small relief bore provided at a suitable point; or either in substitution for or in addition to this relief bore, the air pressure in the said chamber may be discharged through the control valve or through a controlling device specially provided for the purpose.

A chamber in the path of the compressed air flowing into the brake cylinder has been used already in the Knorr goods train brake, but for a different purpose, namely in the service braking position to allow compressed air to pass from the auxiliary reservoir into the chamber, and from the latter, through a throttle bore, in a very gradual manner into the brake cylinder, in order to produce a difference relatively to the increase of pressure in the brake cylinder of the last truck, in which the air from the train pipe and auxiliary reservoir passes quickly through relatively large cross sections into the brake cylinder. The capacity of the said chamber was also in a different ratio to the brake cylinder volume as compared with that of the chamber according to the present invention. Compared with the said chamber for the goods train brake, the arrangement according to this application therefore represents something entirely different and peculiar.

A construction of apparatus according to this invention is diagrammatically illustrated by way of example in the accompanying drawing. To the triple valve $a$ is connected the well known emergency braking device $b$ which, when the triple valve is in the emergency braking position, effects in known manner the connection between the train pipe $c$ and the brake cylinder $d$. Into this connection is inserted the small chamber $e$ forming the subject of the present invention. Practical experiments have shown that a capactiy of about two-fifths of a litre is sufficient for the purpose intended to be attained with the device. Beyond the chamber is arranged a check valve $l$ opening in the direction towards the brake cylinder and preventing a return of the brake cylinder air into the chamber when the pressure in the latter is being relieved. Provision can be made for the relief of the chamber in such a manner that a slide valve forming a part of the usual triple valve connects the chamber $e$ with the atmosphere when the triple valve is in either the service braking position or the release position. This slide valve can be built in the usual triple valve, or a separate control member may be provided for the same purpose. Moreover, the relief of pressure in the chamber could also be ensured by a small bore $g$ provided in the piston $f$ of the emergency braking device, or by a small bore $h$ provided at any suitable point of the wall of the chamber $e$.

The working of the device is as follows: When emergency braking begins, the valve $i$ will be opened by pressure from the auxiliary reservoir acting on the piston $f$; the train pipe pressure under the valve $k$ can then lift the latter, as owing to the opening of the valve $i$ and to the consequent escape of the compressed air contained above the valve $k$ in the direction towards the brake cylinder, the resistance to movement of the valve $k$ is overcome, and train pipe air flows into the pipe leading to the brake cylinder; naturally it fills at once the chamber $e$ situated in its path to the brake cylinder, and thus a quick fall of pressure in the train pipe is produced owing to the action of the identical chambers distributed over the train and mounted on each truck provided with a brake apparatus, after which the air flows into the brake cylinder until the emergency braking device $f$, $i$, $k$ closes again. The compressed air contained in the chamber $e$ can then escape slowly through the bore $g$ or the bore $h$, so that the chamber is soon ready for the next operation.

What I claim and desire to secure by Letters Patent of the United States is:—

1. In a brake accelerator for single chamber compressed air brakes of the character referred to, the combination with a train pipe, a brake cylinder, connections between said pipe and cylinder, and an emergency valve controlling flow of air from said pipe to the brake cylinder through said connections, of an auxiliary chamber in communication with said connections between the train pipe and brake cylinder, for the purpose described.

2. A brake accelerator as in claim 1, wherein means are provided for relieving the pressure in the said chamber when the brake is taken off and during a service braking, whereby an emergency braking, even after previous service braking, is quickly transmitted throughout the train.

WILHELM HILDEBRAND.